United States Patent Office 3,088,577
Patented May 7, 1963

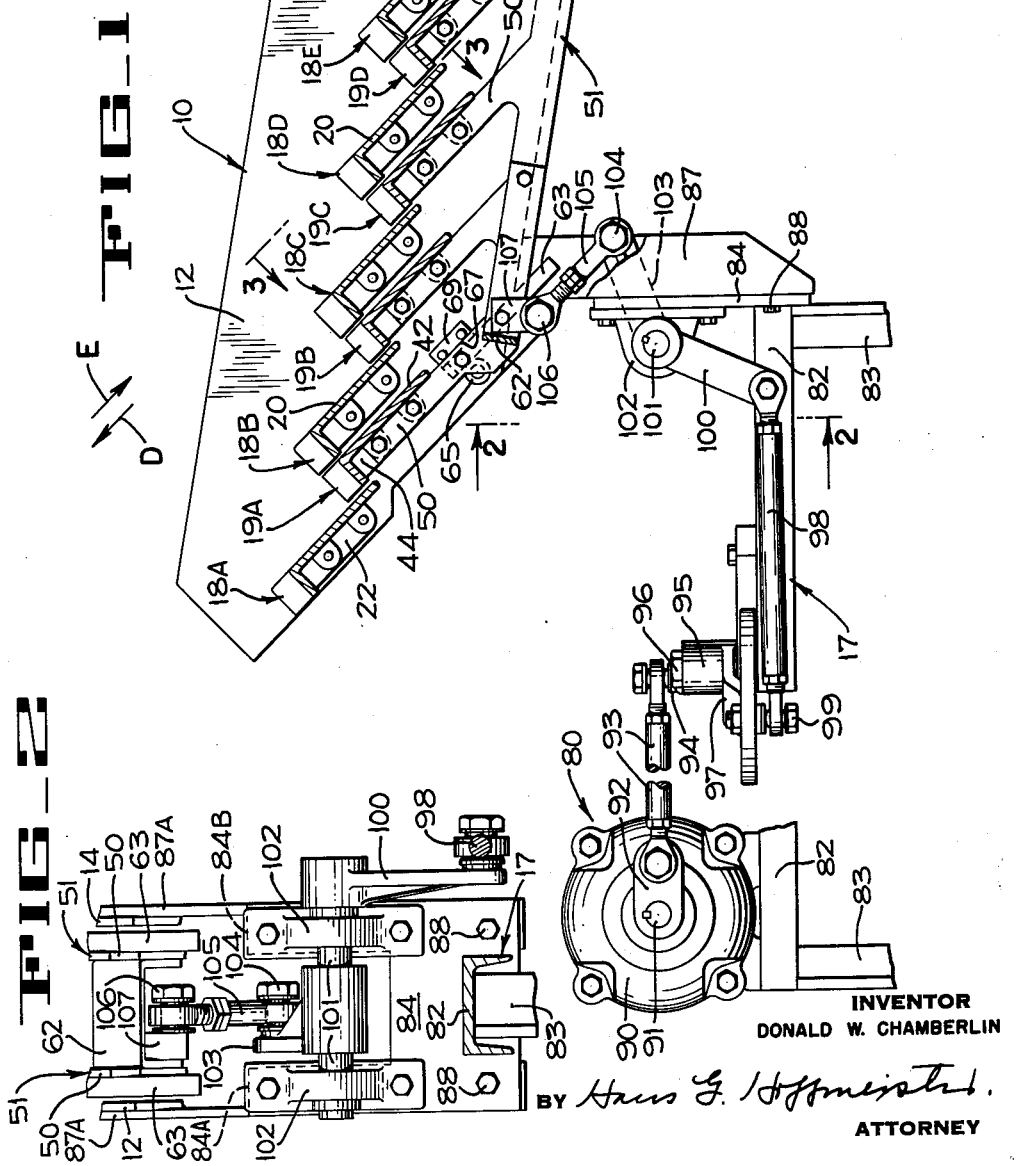

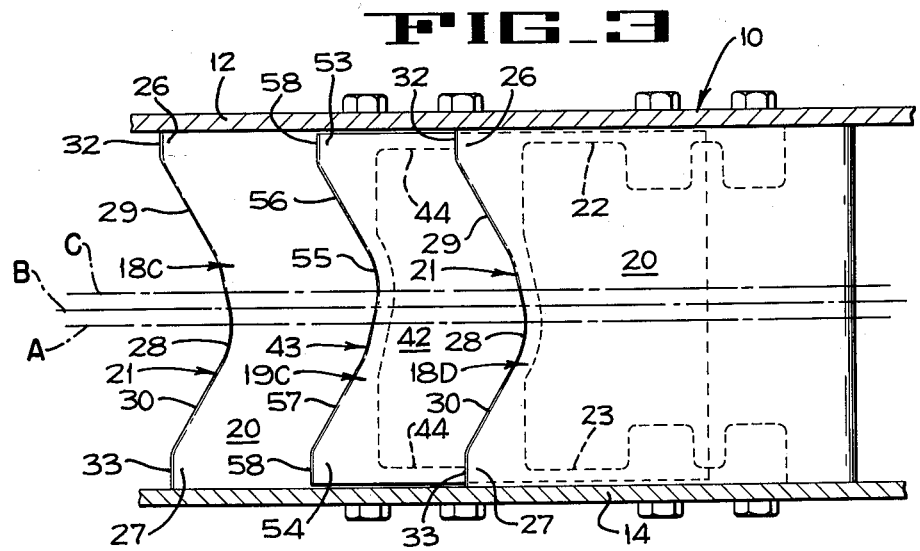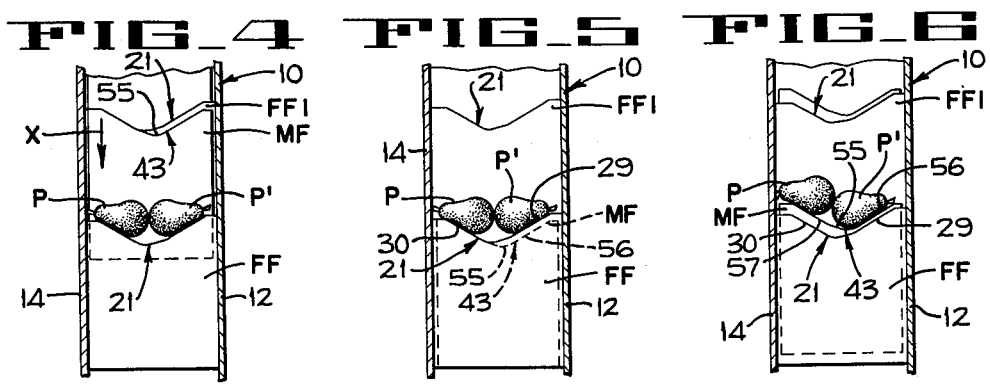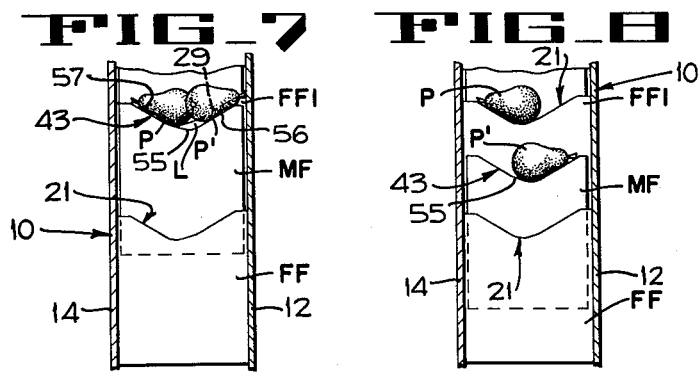

3,088,577
ARTICLE FEEDING MECHANISM
Donald W. Chamberlin, Los Gatos, Calif., assignor to FMC Corporation, San Jose, Calif., a corporation of Delaware
Filed Feb. 19, 1962, Ser. No. 174,118
7 Claims. (Cl. 198—32)

This invention pertains to article feeding apparatus, and more particularly concerns an improved feed mechanism of the shuffle feed type.

Many types of machines process articles one by one and, accordingly, it is necessary that the articles be supplied to these machines one at a time at regularly spaced intervals. If the articles have a uniform size and shape, it is relatively easy to feed them successively to a machine. However, if articles that vary in shape and size, such as pears, are to be fed to a machine, a difficult feeding operation results because the movements of such articles are unpredictable. In the present invention a feed mechanism is provided that is capable of receiving a plurality of irregular articles, such as pears, placing them in single file, and discharging them one by one at regularly spaced intervals. While the machine of the present invention is particularly effective in handling pears, it will be recognized that it has general utility in handling many types of regular and irregular articles.

It is, therefore, an object of the present invention to provide an article feed mechanism capable of receiving articles in a random grouping, arrange the articles in single file, and discharge them one-by-one into a processing machine.

Another object is to provide a mechanism particularly adapted to move two articles from a side-by-side position to a single file position.

Another object is to provide an improved shuffle-type article feeder.

Another object is to provide means for separating two articles moving along a shuffle feed mechnaism and positioning one of the articles in front of the other.

Other and further objects and features of the present invention will be apparent from the following description taken in connection with the accompanying drawings, in which:

FIGURE 1 is an enlarged fragmentary diagrammatic vertical section taken longitudinally through the feed mechanism of the present invention.

FIGURE 2 is a vertical section taken on line 2—2 of FIG. 1.

FIGURE 3 is a fragmentary diagrammatic section taken on line 3—3 of FIG. 1.

FIGURES 4–8 are fragmentary diagrammatic sections, similar to FIG. 3, and showing successive operating positions of the movable flights of the feed mechanism.

The embodiment of the feed mechanism chosen for illustration in FIGURE 1 comprises an upwardly extending sheet metal chute 10 having opposed side walls 12 and 14 (FIG. 2) said walls being supported at their forward end by an upstanding leg member 15 (FIG. 1) which is disposed centrally of a U-shaped bracket 16 that connects the walls. The walls are supported at their rearward ends by a support frame 17 which will be described presently. The floor of the chute 10 is formed by a plurality of stationary flights 18A–18G and movable flights 19A–19F. Each of the stationary flights is made of smooth rigid material and has a flat body portion 20 (FIG. 3), a curved upper edge 21, and two depending side flanges 22 and 23 that are bolted to the side walls 12 and 14, respectively. The upper portion of each of the stationary flights 18A–18G comprises two upwardly projecting legs 26 and 27 defined by a curved lower edge portion 28, upwardly and outwardly inclined edges 29 and 30, and flat upper edges 32 and 33. Thus, a pocket is formed on the upper end of each stationary flight by inclined wall portions extending downwardly from the inclined edges 29 and 30 and a curved wall portion extending downwardly from the curved edge 28. These pockets act as temporary storage shelves on which the articles come to rest as they are advanced along the chute. It will be noted that a vertical plane A passing through the lowest point of the curved lower portion 28 of the edge 21 of each stationary flight is disposed on one side of a vertical plane B passing through the longitudinal centerline of the chute.

The movable flights 19A–19E, which are actually pusher members, are generally similar to the stationary flights 18A–18G, each movable flight comprising a flat body portion 42 (FIG. 3), an upper curved edge 43, and two depending flanges 44, each of which is bolted to a finger 50 of a slide frame 51 (FIG. 1).

As seen in FIG. 3, the upper portion of each movable flight comprises two upwardy projecting legs 53 and 54 defined by a curved lower edge portion 55, upwardly and outwardly inclined edges 56 and 57, and flat upper edges 58. The wall portions extending downwardly from the edges 55, 56 and 57 define a pocket on the article-contacting end surface of the pusher flight. It will be noted that a vertical plane C passing through the lowest portion of the curved edge 55 of each movable flight is disposed on the opposite side of the vertical plane B, passing through the longitudinal centerline of the chute, from plane A. Accordingly, it will be apparent that the curved lower portions 28 of the stationary flights are displaced laterally from the curved lower portions 55 of the movable flights.

There are two identical slide frames 51 (FIG. 1) one disposed adjacent the inner side of each side wall of the chute, and these two slide frames are connected for conjoint movement by a transverse bar 60 and a U-shaped bracket 62, one leg of which is bolted to each slide frame 51. Two of the fingers 50 of each slide frame are provided with bars 63 of rectangular cross-section, each bar being fixedly secured to the associated finger 50 and disposed between a roller 65 projecting inwardly from the adjacent wall of the chute and a ledge 67 provided by a stepped guide member 69 that is bolted to the chute wall.

The slide frames 51 and the movable flights secured thereon are reciprocated in the directions of arrows D and E (FIG. 1) by means of a drive unit 80 that is mounted on the support frame 17. The frame includes a table member 82 supported on legs 83, and a vertically disposed U-shaped bracket 84 that has upstanding legs 84A and 84B (FIG. 2) and is secured to the forward end of the table. The bracket 84 is fixedly secured by bolts 88 to laterally extending flanges of two angle bars 87, each of which has an upper extension 87A secured, as by belts, to the face of one of the side walls 12 or 14 of the chute 10.

The drive unit 80 includes an electric motor 90 that is mounted on the table 82 and has a crank 92 keyed to its output shaft 91. A rod 93 is pivoted at one end to the crank 92 and, at the other end, to one arm 94 of a bellcrank 95 that is pivotally mounted on the table by means of a bolt 96. The other arm 97 of the bellcrank is pivoted by means of a bolt 99 to a rod 98 which, in turn, is pivoted to a lever 100 that is keyed to a shaft 101 rotatably journalled in two bearing blocks 102 (FIG. 2). A second lever 103 is also keyed to shaft 101 and is pivotally connected by a bolt 104 to a rod 105 which is pivoted at 106 to a short tab 107 secured to the U-shaped bracket 62 which connects the rearward ends of the two slide frames 51. It will be evident that, when the motor 90 is in operation, the bellcrank 95 is oscillated about the axis of bolt 96, causing the rod 98 to oscillate the second lever 103 about the axis of shaft 101. Accordingly, the rod 105 and the attached slide frames 51 are reciprocated in the direction of arrows D and E.

During reciprocation of the slide frames 51, each movable flight 19A–19F moves between a lower position in which it underlies one of the fixed flights 18B–18G and an upper position overlying the fixed flight immediately above. In each position, the upper curved edge 43 of the movable flight is substantially in alignment with the upper curved edge 21 of the adjacent fixed flight although, as will be explained presently, the fact that the lower curved portions 28 and 55 of the flights are displaced laterally, causes a ledge-like portion of the underlying stationary flight to remain exposed even when the movable flight is in its uppermost position.

The fruit, that is to be arranged in single file and discharged over the upper end of the chute 10, is deposited at the lower end of the chute 10 by any conventional supply mechanism such as a conveyor belt (not shown) having suitable deflector means for directing the fruit down a ramp 117 (FIG. 1) into a supply hopper 120 formed by the ramp 117, the side walls 12 and 14 of the chute 10, and the flights 18F, 18G, 19E and 19F.

The coaction of the fixed and movable flights in arranging the fruit in single file is illustrated in FIGURES 4–8. In FIG. 4, two pears P and P' are shown resting on the curved edge 21 of a fixed flight indicated by the reference character FF. The movable flight MF is, at this time, in its uppermost position ready to move downwardly as indicated by arrow X. When the flight MF reaches its lower position, and its upper edge 43 becomes generally aligned with the upper edge 21 of the fixed flight FF, the pears drop downwardly so that they are in front of the two aligned curved edges as seen in FIG. 5. Then, when the movable flight is again moved upwardly, the pears are propelled upwardly. Sometime before the movable flight reaches its upper position, one of the pears usually attains a position in the curved lower portion 55 of the movable flight MF while the other pear drops off the movable flight and moves downwardly to the stationary flight it just left. This is the normal operation of a shuffle type feed mechanism and it results in the movement of a certain portion of the pears to single file formation.

In addition to this usual singulating action, the flights of the present invention are so designed that they carry out additional singulating actions. In FIG. 5 the movable flight MF has moved to its lowermost position and both pears P and P' have dropped down onto the fixed flight FF1 and are in position in front of the upper edges of flights FF and MF. It will be noted that, in this lower position, the inclined edge 56 of flight MF is at a lower level than the inclined edge 29 of flight FF, while the edge 57 of flight MF is directly in alignment with the edge 30 of flight FF and is not visible in FIG. 5. When the flight MF starts upwardly, the edge 57 immediately starts moving the pear P upwardly. Shortly thereafter the edge 56 of flight MF engages the pear P' and starts its upward movement. Since the upward movement of pear P is begun before the upward movement of pear P', the pears tend to assume the positions illustrated in FIG. 6, with pear P somewhat ahead of pear P', as the flight MF continues its upward movement. When the flight MF reaches its uppermost position shown in FIGURE 7, the edge 57 of the flight becomes aligned with the edge 30 of fixed flight FF1 next above and the pear P drops down in front of these edges and starts moving laterally toward the longitudinal centerline of the flights. At this time the edge 56 of flight MF has stopped at a point below the edge 29 of flight FF1 leaving a ledge portion L of the flight FF1 uncovered to act as a retaining ledge for preventing the pear P' from dropping down onto the flight FF1. Since the pear P' is partly supported by pear P and by ledge L, it cannot drop onto flight FF1 and must move back down the chute with the movable flight MF, as indicated in FIG. 8. When the pear P' drops down the chute, the pear P moves to the desired central position.

Referring to FIG. 6, it will be evident that, if the movable flight is stopped during its downward movement at a position slightly below the position indicated in FIG. 6, at which the edge 56 is in alignment with the edge 29, a ledge-like portion of the movable flight MF would remain exposed. If two articles such as pears P and P' were at rest on the fixed flight FF, pear P in front of edge 30 and pear P' in front of edge 29, pear P' would drop onto plate FF1 while pear P would still be supported by the exposed ledge of flight MF. When the flight MF is next moved upwardly, pear P' would be immediately moved upwardly by edge 56 of flight MF while the upward movement of pear P would be retarded by said ledge. Thus pear P' would tend to move toward centered position causing pear P to remain adjacent edge 21 of flight FF or tumble back down toward this edge.

Also, it will be evident that, by varying the length of the fixed flights FF and the design of the upper edges, an arrangement can be made in which, during each reciprocation of a movable flight MF, an exposed ledge such as ledge L (FIG. 7) can be obtained on the upper fixed flight and an exposed ledge on the movable flight can be obtained. Thus, in FIG. 7, if the left side portion of the upper edge 21 of flight FF were cut off at a flatter angle relative to a transverse plane of the chute, a ledge portion of the movable flight MF would remain exposed when the movable flight reaches its lower most position. With this arrangement, a twisting action on the pears can be obtained by ledges at the top and at the bottom of the stroke of the movable flight.

It will, therefore, be evident that the present invention provides a novel mechanism for quickly and effectively separating articles one by one from a group of articles deposited in random formation in a supply hopper. The feature of arranging the edge at one side of the movable flight in leading relation to the edge at the other side of the flight so that an article on the leading edge will be moved upwardly ahead of an article on the trailing edge, materially aids in causing articles to be moved into single file, and this feature in conjunction with the concept of stopping the upward movement of the movable flight at a position wherein a ledge portion of the underlying stationary flight is still exposed for supporting one of the pears, provides a new, effective singulating action for shuffle type feed mechanisms.

While a particular embodiment of the feed mechanism of the present invention has been shown and described, it will be understood that the mechanism is capable of modification and variation without departing from the principles of the invention, and that the scope of the invention should be limited only by the scope and proper interpretation of the claims appended hereto.

I claim:

1. In an article feed mechanism of the type in which each of a plurality of pusher members reciprocates between a forward stationary flight and a rearward stationary flight to advance articles step by step from a position in front of the forward edge of the rearward flight to a position in front of the forward edge of the forward flight, the improvement which comprises a pair of article-pushing surfaces on the forward end of said pusher including a first surface defining the foremost edge of said pusher and a second surface disposed rearwardly from said foremost edge whereby when articles are advanced simultaneously by said first and second pushing surfaces, the article associated with said first surface will reach the edge of the forward stationary flight and will drop over said edge before the article being advanced by said second surface is in position to drop over said edge.

2. An article feed mechanism comprising a pair of spaced generally vertical plates defining the side walls of a chute, a plurality of stationary article supporting flights secured to and extending transversely in parallel relation between said plates, each flight having a body portion and a curved wall at the forward end of said body, a pusher mounted for reciprocating movement between each pair of adjacent plates from a rearward position underlying the rearward one of said two flights to a forward position overlying the forward one of said two flights, each pusher having a forward end portion with a first article-pushing surface defining the forwardmost part of said pusher and a second article-pushing surface spaced rearwardly from said first article-pushing surface, means for reciprocating said pusher, rearward movement of said pusher being effective to position said first pushing surface in general alignment with the curved end wall of said rearward flight whereby articles disposed in front of said end wall will drop to a position in front of said pusher, and forward movement of said pusher being effective to move the first article-pushing surface of the pusher into alignment with the end wall of the forward one of said flights and cause articles being advanced by said first article-pushing surface to drop over said end wall, said second article-pushing surface being disposed rearwardly of said end wall when said pusher is in forward position, whereby a ledge portion of said forward flight will remain exposed to support articles advanced by said second pushing surface and restrain the articles against movement over said end wall.

3. In an article feed mechanism of the type in which each of a plurality of pusher members reciprocates between a forward and a rearward stationary flight to advance articles step by step from a position in front of the forward edge of the rearward flight to a position in front of the forward edge of the forward flight, the improvement which comprises means providing a storage shelf on the forward end of each stationary flight, a pair of article-pushing surfaces on the forward end of said pusher including a first surface defining the foremost edge of said pusher and a second surface disposed rearwardly from said foremost edge, means for moving said pusher forwardly to bring said first surface into alignment with the shelf of the forward stationary flight and to bring said second pusher surface to a position spaced from said shelf, whereby an article in front of said first surface will drop to a position in front of said shelf, and an article in front of said second pusher surface will be disposed in contact with the ledge portion of said stationary flight remaining exposed in front of said second pushing surface.

4. In an article feed mechanism of the type in which each of a plurality of pusher members reciprocates between a forward and a rearward stationary flight to advance articles step by step from a position in front of the forward edge of the rearward flight to a position in front of the forward edge of the forward flight, the improvement which comprises means providing a storage shelf on the forward end of each stationary flight, a pair of article-pushing surfaces on the forward end of said pusher including a first surface defining the foremost edge of said pusher and a second surface disposed rearwardly from said foremost edge, means for moving said pusher rearwardly to bring said second pusher surface into alignment with the shelf of the rearward stationary flight and to bring said first pusher surface to a position spaced from said shelf, whereby an article disposed in front of said shelf will drop to a position in front of said second pusher surface and an article in front of said shelf will be disposed in contact with the ledge portion of said movable flight remaining exposed in front of said first pushing surface, and means for moving said pusher forwardly causing said second pusher surface to move an article upwardly while the article on said ledge portion will be restrained from upward movement by its engagement with said ledge.

5. In an article feed mechanism of the type in which each of a plurality of pusher members reciprocates between a forward and a rearward stationary flight to advance articles step by step from a position in front of the forward edge of the rearward flight to a position in front of the forward edge of the forward flight, the improvement which comprises means providing a storage shelf on the forward end of each stationary flight said shelf including a central curved wall portion and an outer wall portion on each side of said central portion and inclined downwardly and inwardly toward said central portion, a pair of article-pushing surfaces on the forward end of said pusher including a first surface defining the foremost edge of said pusher and a second surface disposed rearwardly from said foremost edge, means for moving said pusher forwardly to bring said first surface into alignment with the shelf of the forward stationary flight and to bring said second pusher surface to a position spaced from said shelf, whereby an article in front of said first surface will drop to a position in front of said shelf and will roll down an inclined wall portion of said shelf to be centered in said central curved wall portion, and an article in front of said second pusher surface will be disposed in contact with the ledge portion of said stationary flight remaining exposed in front of said second pushing surface, and means for moving said pusher rearwardly to permit the article on said ledge to move rearwardly.

6. In an article feed mechanism of the type in which each of a plurality of pusher members reciprocates between a forward and a rearward stationary flight to advance articles step by step from a position in front of the forward edge of the rearward flight to a position in front of the forward edge of the forward flight, the improvement which comprises means providing a storage shelf on the forward end of each stationary flight, the stationary shelf on said rearward flight having a first shelf portion defining the foremost edge of the flight, and a second shelf portion disposed rearwardly from said edge, a pair of article-pushing surfaces on the forward end of said pusher including a first pushing surface defining the foremost edge of said pusher and a second pushing surface disposed rearwardly from said foremost edge, means for moving said pusher forwardly to bring said first surface into alignment with the shelf of the forward stationary flight and to bring said second pusher surface to a position spaced rearwardly from said shelf, whereby an article in front of said first surface will drop to a position in front of said shelf, and an article in front of said second pusher surface will be disposed in contact with the ledge portion of said stationary flight remaining exposed in front of said second pushing surface, means for moving said pusher rearwardly to permit the article on said shelf to move downwardly and to bring said second pushing surface into alignment with the first shelf portion of said rearward flight and to bring said first pushing surface of said pusher to a position spaced forwardly from said second shelf portion of said rearward flight whereby an article disposed in front of said first shelf portion will drop to a position in front of said second pushing surface and an article in front of said second shelf portion will be disposed in contact with the ledge portion of said pusher remaining exposed in front of said second shelf portion.

7. An article feed mechanism comprising a pair of spaced generally vertical plates defining side walls of a chute, upper and a lower stationary article-supporting flights secured to and extending transversely in parallel relation between said plates, each stationary flight having a flat body portion and an article-supporting shelf at one end extending transversely across the upper end of said body portion and including a pair of oppositely inclined wall portions and a curved wall portion between said inclined wall portions, an article-advancing flight mounted for reciprocating movement between said upper and lower article-supporting flights, said movable flight having a flat body portion and an article-pushing end face including a pair of oppositely inclined wall portions and a curved wall portion between said inclined wall portions, the curved central wall of said movable flight being offset laterally of the chute from the curved central wall of the stationary flights, means for moving said movable flight from a lower position in which said pushing edge is in general alignment with the article-supporting shelf of the overlying stationary flight to an elevated position in which one of the inclined walls of said end face is disposed in general alignment with an adjacent inclined wall of the shelf of the underlying stationary flight, the other inclined wall of said end face being disposed in spaced relation below the adjacent inclined wall of said shelf.

No references cited.